United States Patent
Kim et al.

(10) Patent No.: US 11,841,744 B2
(45) Date of Patent: Dec. 12, 2023

(54) ELECTRONIC DEVICE COMPRISING DUAL DISPLAY AND KEYBOARD

(71) Applicant: Samsung Electronics Co., Ltd., Gyeonggi-do (KR)

(72) Inventors: Byungsik Kim, Gyeonggi-do (KR); Hwanmyung Noh, Gyeonggi-do (KR); Myoungkyu Lee, Gyeonggi-do (KR); Seungwoon Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 47 days.

(21) Appl. No.: 17/478,126

(22) Filed: Sep. 17, 2021

(65) Prior Publication Data

US 2022/0004228 A1    Jan. 6, 2022

Related U.S. Application Data

(63) Continuation of application No. PCT/KR2020/003896, filed on Mar. 20, 2020.

(30) Foreign Application Priority Data

Mar. 20, 2019    (KR) .................. 10-2019-0032029

(51) Int. Cl.
  *G06F 1/16*    (2006.01)
(52) U.S. Cl.
  CPC ............ *G06F 1/1649* (2013.01); *G06F 1/165* (2013.01); *G06F 1/1618* (2013.01); *G06F 1/1669* (2013.01); *G06F 1/1681* (2013.01)
(58) Field of Classification Search
  CPC ...... G06F 1/1649; G06F 1/1618; G06F 1/165; G06F 1/1669; G06F 1/1681
  See application file for complete search history.

(56) References Cited

U.S. PATENT DOCUMENTS 5,739,810 A * 4/1998 Merkel ................. G06F 1/1616
                                             361/679.2
6,016,176 A * 1/2000 Kim ....................... G09F 9/301
                                             349/158

(Continued)

FOREIGN PATENT DOCUMENTS

KR    10-2003-0012076    2/2003
KR       20-0304329      2/2003

(Continued)

OTHER PUBLICATIONS

PCT/ISA/210 Search Report issued on PCT/KR2020/003896 pp. 3.
PCT/ISA/237 Written Opinion issued on PCT/KR2020/003896 pp. 4.

*Primary Examiner* — Adrian S Wilson
(74) *Attorney, Agent, or Firm* — The Farrell Law Firm, P.C.

(57) ABSTRACT

An electronic device includes a first housing including a first housing comprising a first side surface, a second side surface positioned on an opposite side of the first side surface, a first plate disposed between the first side surface and the second side surface, and a first display; a second housing comprising a third side surface capable of facing at least a part of the second side surface, a fourth side surface positioned on an opposite side of the third side surface, a second plate disposed between the third side surface and the fourth side surface, and a second display, the second housing having a recess disposed on a rear surface of the second plate; and a third housing comprising a keyboard having multiple movable keycaps, the third housing being coupled so as to rotate with at least a part of the fourth side surface or to slide through at least a part of the fourth side surface such that the third housing is configured to be received in the recess.

12 Claims, 12 Drawing Sheets

(56) References Cited

U.S. PATENT DOCUMENTS

| | | | | |
|---|---|---|---|---|
| 6,116,767 A * | 9/2000 | Chaiken | G06F 3/0653 345/169 |
| 6,262,785 B1 * | 7/2001 | Kim | G06F 1/1683 361/679.04 |
| 6,421,235 B2 * | 7/2002 | Ditzik | G06F 1/1669 361/679.3 |
| 6,480,373 B1 * | 11/2002 | Landry | G06F 1/1669 708/142 |
| 6,643,124 B1 * | 11/2003 | Wilk | H04M 1/0247 345/169 |
| 6,700,773 B1 * | 3/2004 | Adriaansen | G06F 1/1643 361/679.08 |
| 6,744,623 B2 * | 6/2004 | Numano | G06F 1/165 345/87 |
| 6,819,304 B2 * | 11/2004 | Branson | G06F 1/1677 345/1.3 |
| 6,865,075 B2 * | 3/2005 | Oakley | G06F 1/1618 345/905 |
| 6,980,423 B2 * | 12/2005 | Tanaka | G06F 1/162 292/45 |
| 7,061,472 B1 * | 6/2006 | Schweizer | G06F 1/1669 361/679.04 |
| 7,136,282 B1 * | 11/2006 | Rebeske | G06F 1/1654 361/679.55 |
| 7,353,050 B2 * | 4/2008 | Im | H04M 1/022 455/575.4 |
| 7,489,503 B2 * | 2/2009 | Maatta | G06F 1/1624 16/367 |
| 7,787,914 B2 * | 8/2010 | Ahn | H04M 1/022 455/575.4 |
| 7,970,442 B2 * | 6/2011 | Chiang | H04M 1/0254 455/575.1 |
| 8,203,832 B2 * | 6/2012 | Szabolcsi | G06F 1/1669 361/679.04 |
| 8,208,249 B2 * | 6/2012 | Chin | G06F 1/1618 361/679.55 |
| 8,310,823 B2 * | 11/2012 | Stoltz | G06F 1/169 361/679.16 |
| 8,331,098 B2 * | 12/2012 | Leung | G06F 3/04886 361/755 |
| 8,396,519 B2 * | 3/2013 | Christensen | H04M 1/0216 455/575.4 |
| 8,724,301 B2 * | 5/2014 | Mahmoud | G06F 3/045 361/679.04 |
| 9,292,114 B2 * | 3/2016 | Adamson | G06F 3/0416 |
| 9,547,341 B2 * | 1/2017 | Aono | G06F 1/1681 |
| 9,871,544 B2 * | 1/2018 | Mercer | H04B 1/3838 |
| 9,983,632 B2 * | 5/2018 | Kuscher | G06F 1/1616 |
| 10,033,087 B2 * | 7/2018 | Sultenfuss | H04B 7/0602 |
| 10,203,728 B2 * | 2/2019 | Koo | G06F 1/1662 |
| 10,222,824 B2 * | 3/2019 | Quiet | H04N 5/23238 |
| 10,254,803 B1 * | 4/2019 | Quinn | G06F 1/1688 |
| 10,296,052 B1 * | 5/2019 | Quinn | G06F 3/03547 |
| 10,416,719 B2 * | 9/2019 | Chun | G06F 3/147 |
| 10,503,215 B1 * | 12/2019 | Quinn | G06F 3/0487 |
| 10,564,674 B2 * | 2/2020 | Fujimoto | G06F 1/1649 |
| 10,976,779 B1 * | 4/2021 | Tsai | G06F 1/1615 |
| 11,023,016 B2 * | 6/2021 | Kim | G06F 1/1618 |
| 11,347,367 B2 * | 5/2022 | Hong | G06F 1/1641 |
| 2002/0141146 A1 * | 10/2002 | Mustoe | G06F 1/1649 361/679.04 |
| 2004/0108968 A1 * | 6/2004 | Finke-Anlauff | G06F 1/1616 345/1.1 |
| 2004/0160736 A1 * | 8/2004 | Lin | G06F 1/1616 361/679.04 |
| 2006/0012563 A1 * | 1/2006 | Fyke | H04M 1/0241 345/156 |
| 2006/0034042 A1 * | 2/2006 | Hisano | G09F 9/301 361/679.04 |
| 2006/0050169 A1 * | 3/2006 | Misawa | G06F 1/1698 348/333.06 |
| 2006/0104013 A1 * | 5/2006 | Sakakibara | G06F 1/1643 361/679.56 |
| 2006/0126284 A1 * | 6/2006 | Moscovitch | G06F 1/1649 361/679.04 |
| 2007/0097014 A1 * | 5/2007 | Solomon | G06F 1/1616 345/1.1 |
| 2007/0247432 A1 * | 10/2007 | Oakley | G06F 1/1677 345/169 |
| 2008/0270899 A1 | 10/2008 | Duncan | |
| 2009/0034173 A1 * | 2/2009 | Shaum | G06F 1/1616 361/679.28 |
| 2009/0149226 A1 * | 6/2009 | Watanabe | H04M 1/022 455/575.3 |
| 2010/0039764 A1 * | 2/2010 | Locker | G06F 1/1615 361/679.29 |
| 2011/0080702 A1 | 4/2011 | Ladouceur et al. | |
| 2011/0216064 A1 * | 9/2011 | Dahl | H04M 1/0247 345/428 |
| 2011/0310580 A1 * | 12/2011 | Leung | G06F 3/04886 361/807 |
| 2012/0129581 A1 | 5/2012 | Choi et al. | |
| 2012/0139815 A1 * | 6/2012 | Aono | G06F 1/1616 345/1.3 |
| 2012/0264489 A1 | 10/2012 | Choi et al. | |
| 2013/0076595 A1 * | 3/2013 | Sirpal | G06F 3/1438 345/1.3 |
| 2014/0011548 A1 * | 1/2014 | Varela | G06F 1/1681 455/566 |
| 2014/0160654 A1 * | 6/2014 | Yoo | G06F 1/1637 361/679.12 |
| 2014/0204519 A1 * | 7/2014 | Wu | G06F 1/1669 361/679.17 |
| 2014/0204520 A1 * | 7/2014 | Wu | G06F 1/1669 361/679.17 |
| 2014/0226275 A1 * | 8/2014 | Ko | G06F 1/1652 361/679.27 |
| 2014/0375530 A1 * | 12/2014 | Delaporte | G06F 1/1652 345/1.3 |
| 2014/0376179 A1 * | 12/2014 | Jenkins | G06F 1/1698 361/679.55 |
| 2016/0202733 A1 * | 7/2016 | Ho | G06F 1/1667 361/679.12 |
| 2017/0337025 A1 | 11/2017 | Finnan | |
| 2019/0220061 A1 * | 7/2019 | Fujimoto | G06F 1/16 |
| 2019/0339738 A1 * | 11/2019 | Hou | G06F 1/1677 |
| 2019/0339744 A1 * | 11/2019 | Oakley | G06F 1/1681 |
| 2020/0064892 A1 * | 2/2020 | Iyer | G06F 3/04847 |
| 2020/0103936 A1 * | 4/2020 | Zhang | G06F 1/165 |
| 2020/0110470 A1 * | 4/2020 | Meyers | G06F 3/044 |
| 2020/0233536 A1 * | 7/2020 | Hong | G06F 1/1641 |

FOREIGN PATENT DOCUMENTS

| | | |
|---|---|---|
| KR | 10-2010-0088983 | 8/2010 |
| KR | 10-2012-0053685 | 5/2012 |
| KR | 10-2012-0117140 | 10/2012 |

\* cited by examiner

ELECTRONIC DEVICE COMPRISING DUAL DISPLAY AND KEYBOARD

CROSS-REFERENCE TO RELATED APPLICATION(S)

This application is a continuation of International Application No. PCT/KR2020/003896, which was filed on Mar. 20, 2020, and is based on and claims priority under 35 U.S.C. § 119 to Korean Patent Application No. 10-2019-0032029, which was filed in the Korean Intellectual Property Office on Mar. 20, 2019, the entire disclosure of each of which is incorporated herein by reference.

BACKGROUND

1. Field

The present disclosure relates, generally, to an electronic device including a dual display and a keyboard.

2. Description of Related Art

In general, "electronic devices" may refer to devices configured to enable utilization of communication functions (for example, voice communication or short message transmission), multimedia functions (for example, music or moving image playback), and entertainment functions (for example, gaming). Such electronic devices may include desktop computers used at homes or offices and laptop computers having improved portability and space availability in general use environments including homes or offices.

A laptop computer may include a display unit for visually providing information to the outside (for example, to a user), a keyboard, a component for displaying a screen on the display unit, and a body unit containing various control circuits, and the display unit and the body unit may be rotatably connected by using a hinge, thereby providing a simple configuration.

In order to provide visual information through a larger screen, a laptop computer may employ a dual display. According to the prior art, the conventional keyboard that is physically clicked may be removed, and a touch panel may be added to at least one of the two displays, thereby providing a software-based video keyboard.

However, if a software-based keyboard is provided on the display, the user may be inconvenienced after a long period of key input when physically clicking may have been preferred.

A Bluetooth™ keyboard having a physical keyboard may be used together with the dual display, but carrying a separate Bluetooth™ keyboard together with the laptop computer may inconvenience the user.

Meanwhile, in the case of conventional laptop computers, the display is not seen from the outside when the display unit is closed, and the user needs to manually open the display unit to check the status of the laptop computer.

SUMMARY

The present disclosure has been made to address the above-mentioned problems and disadvantages, and to provide at least the advantages described below.

According to an aspect of the present disclosure, an electronic device includes a first housing including a first side surface, a second side surface positioned on an opposite side of the first side surface, a first plate disposed between the first side surface and the second side surface, and a first display; a second housing including a third side surface capable of facing at least a part of the second side surface, a fourth side surface positioned on an opposite side of the third side surface, a second plate disposed between the third side surface and the fourth side surface, and a second display, the second housing having a recess disposed on a rear surface of the second plate; and a third housing including a keyboard having multiple movable keycaps, the third housing being coupled so as to rotate with at least a part of the fourth side surface or to slide through at least a part of the fourth side surface such that the third housing is configured to be received in the recess.

According to an aspect of the present disclosure, an electronic device includes a first housing including a first side surface, a second side surface positioned on the opposite side of the first side surface, a first plate disposed between the first side surface and the second side surface, and a first display; a second housing including a third side surface capable of facing at least a part of the second side surface, a fourth side surface positioned on the opposite side of the third side surface, a second plate disposed between the third side surface and the fourth side surface, and a second display; and a third housing including a keyboard having multiple movable keycaps, the third housing being connected to at least a part of the fourth side surface and detachably coupled to at least a part of the fourth side surface of the second housing.

According to an aspect of the present disclosure, an electronic device includes a first housing including a first display; a second housing including a second display; and a third housing including a keyboard having multiple movable keycaps, the third housing being detachably coupled to a recess disposed in the second housing, wherein the third housing is coupled so as to rotate while being connected to at least a part of the second housing or to slide through at least one side surface of the second housing such that the third housing can be received in the recess, and in a state in which the first housing is fully folded with respect to the second housing, a part of one of the first display and the second display is visible from the outside.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
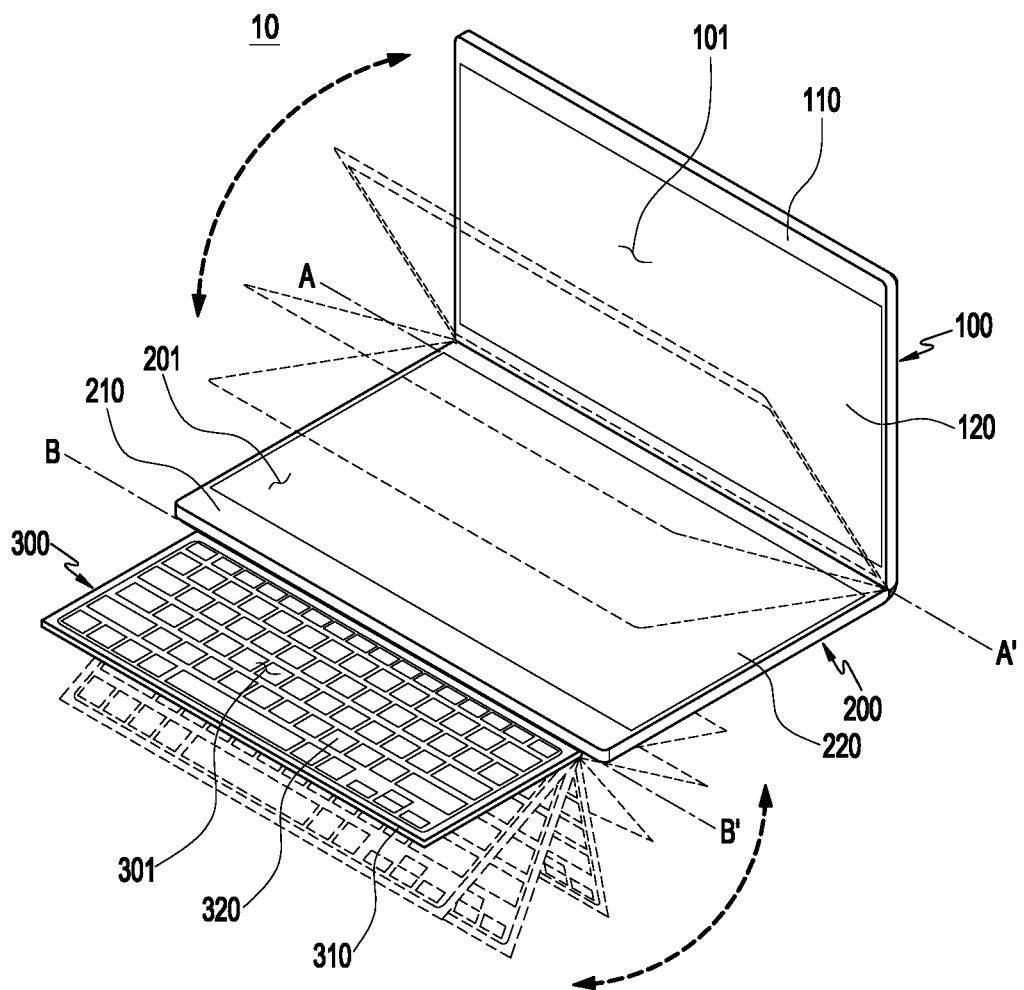
FIG. 1 is a perspective view illustrating an unfolded state of an electronic device, according to an embodiment.

Various embodiments of the disclosure may provide an electronic device including a large-screen dual display and further including a keyboard that can be attached/detached (separated or integrally used) to/from the housing including the dual display.

Various embodiments of the disclosure may provide an electronic device having an always on display (AOD) function such that, even when the display unit is closed, the user can check the status of the electronic device.

According to various embodiments of the disclosure, an electronic device having a dual display applied thereto may be provided such that the user can perform a task through a large screen, and a physically clicked keyboard is provided such that usability is improved.

According to various embodiments of the disclosure, even when a display unit is closed, at least a part of one of two displays can be seen from the outside. This is advantageous in that the user can check the status of the electronic device without manually opening the display unit.

Various embodiments of the disclosure will be described with reference to the accompanying drawings. It should be appreciated that the embodiments and the terms used are not intended to limit the technological features set forth herein to particular embodiments and include various changes, equivalents, and/or alternatives for a corresponding embodiment. With regard to the description of the drawings, similar reference numerals may be used to designate similar or relevant elements. A singular expression may include a plural expression unless they are definitely different in the context.

As used herein, such expressions as "A or B", "at least one of A and B", or "at least one of A or B" may include all possible combinations of items enumerated together. Such expressions as "a first", "a second", "the first", or "the second" may modify corresponding elements regardless of the order and/or the importance thereof. These expressions are used merely to distinguish between one element and any other element, and do not limit the corresponding elements. When an element (e.g., a first element) is referred to as being (operatively or communicatively) "connected" or "coupled" to another element (e.g., a second element), the element may be connected or coupled to the other element directly or via another element (e.g., a third element).

As used herein, the expression "configured to" may be interchangeably used with, for example, "suitable for", "having the capability to", "adapted to", "made to", "capable of", or "designed to" in hardware or software according to situations. In some situations, the expression "device configured to" may mean that the device, together with other devices or components, "is able to". For example, the phrases "processor adapted to perform A, B, and C" or "processor configured to perform A, B, and C" may mean a dedicated processor (e.g., an embedded processor) only for performing the corresponding operations or a general-purpose processor (e.g., a central processing unit (CPU) or application processor (AP)) that can perform the corresponding operations by executing one or more software programs stored in a memory device.

The electronic device according to various embodiments of the disclosure may include at least one of, for example, a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture expert group (MPEG)-1 audio layer-3 (MP3) player, a mobile medical device, a camera, and a wearable device. The wearable device may include at least one of an accessory type device (e.g., a watch, a ring, a bracelet, an anklet, a necklace, glasses, a contact lens, or a head-mounted device (HMD)), a fabric or clothing-integrated type device (e.g., electronic clothing), a body-mounted type device (e.g., a skin pad or tattoo), and a bio-implantable type (e.g., an implantable circuit). The electronic device may include at least one of, for example, a television, a digital video disk (DVD) player, an audio device, a refrigerator, an air conditioner, a vacuum cleaner, an oven, a microwave oven, a washing machine, an air purifier, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, or a body temperature measuring device), a magnetic resonance angiography (MRA) device, a magnetic resonance imaging (MRI) device, a computed tomography (CT) machine, or an ultrasonic machine), a navigation device, a global positioning system (GPS) receiver, an event data recorder (EDR), a flight data recorder (FDR), a vehicle infotainment device, electronic equipment for a ship (e.g., a ship navigation device or a gyro-compass), an avionics device, a security device, an automobile head unit, a home or industrial robot, an automatic teller's machine (ATM), a point of sales (POS)

device in a shop, or Internet of things devices (e.g., a light bulb, various sensors, an electric or gas meter, a sprinkler device, a fire alarm, a thermostat, a streetlamp, a toaster, sporting goods, a hot water tank, a heater, or a boiler). The electronic device may include at least one of a part of furniture or a building/structure, an electronic board, an electronic signature receiving device, a projector, and various kinds of measuring instruments (e.g., a water meter, an electric meter, a gas meter, or a radio wave meter). The electronic device may be flexible, or may be a combination of one or more of the aforementioned various devices. The electronic device is not limited to the aforementioned devices. The term "user" may refer to a person using an electronic device or a device (e.g., an artificial intelligence electronic device) using an electronic device.

Figure 2:
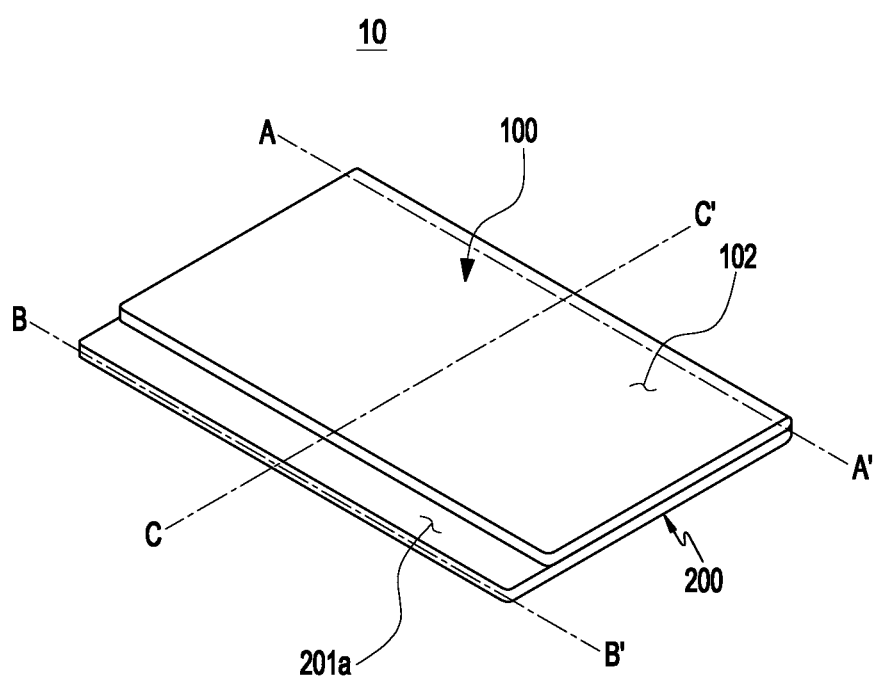
FIG. 2 is a perspective view illustrating a folded state of an electronic device, according to an embodiment.

FIG. 1 is a perspective view illustrating an unfolded state of an electronic device 10, according to an embodiment. FIG. 2 is a perspective view illustrating a folded state of the electronic device 10, according to an embodiment. FIG. 2 illustrates a state in which a display portion (e.g., a display region including a first display and a second display) of the electronic device 10 is fully closed.

Referring to FIG. 1, the electronic device 10 may be a laptop computer in which two different housings each including a display are rotatably coupled to each other.

The electronic device 10 may include a first housing 100 including a first display 120, and a second housing 200 including a second display 220.

The first housing 100 may have the first display 120 mounted on a first plate 110, and may be a part in which the first display 120 is seen through a front surface 101 of the first housing 100 when the electronic device 10 is unfolded. The second housing 200 may have the second display 220 mounted on a second plate 210, and may be a part in which the second display 220 is seen through a front surface 201 of the second housing 200 when the electronic device 10 is unfolded.

The electronic device 10 is a dual display electronic device 10 including the first display 120 and the second display 220, and each of the displays may include, for example, a liquid crystal display (LCD), a light-emitting diode (LED) display, an organic light-emitting diode (OLED) display, a microelectromechanical system (MEMS) display, or an electronic paper display. The first display 120 and the second display 220 may display various contents (e.g., text, images, videos, icons, or symbols) to a user. The first display 120 and the second display 220 may include a component (e.g., a digitizer) for implementing a function of a touch screen, and may receive, for example, a touch input, a gesture input, a proximity input, or a hovering input using an electronic pen or a part of the body of a user.

The electronic device 10 may further include a third housing 300 having a keyboard 320 including multiple movable keycaps. When the electronic device 10 is unfolded, the third housing 300 may also be used in an unfolded state. When the third housing 300 is used in an unfolded state, for example, the third housing 300 may be placed in a state in which a user can perform an input to the keyboard having the multiple movable keycaps. The keyboard may be provided to the outside (e.g., to a user) through a front surface 301 of the third housing 300.

The multiple movable keycaps may be keycaps capable of providing a physical click feeling to a user. The multiple movable keycaps may include various input devices that provide a physical click feeling, such as a keyboard-type keycap, a pad-type keycap, or a mouse. A member such as a spring and/or a membrane may be further disposed on one surface (e.g., a lower surface) of a keycap. The keyboard 320 including the multiple movable keycaps may be included in the electronic device 10 so that it is not inconvenient when a user performs a key input for a long time (e.g., when a user types for a long time), since a more dynamic and preferred keystroke feeling can be provided when compared to providing a keyboard implemented by software on a display.

The first housing 100 and the second housing 200 may rotate along a rotation axis in a direction of line A-A' as shown in FIG. 1, and the second housing 200 and the third housing 300 may rotate along a rotation axis in a direction of line B-B'. The rotation axis in the direction of line A-A' and the rotation axis in the direction of line B-B' may be parallel to each other.

The first housing 100 and the second housing 200 may be rotatably coupled to each other along the rotation axis in the direction of line A-A'. As shown in FIG. 1, the first housing 100 may be rotated with respect to the second housing 200 such that the front surface 101 of the first housing 100 faces the front surface 201 of the second housing 200, or may be rotated such that a rear surface 102 of the first housing 100 faces a rear surface 202 of the second housing 200.

The second housing 200 and the third housing 300 may be rotatably coupled to each other along the rotation axis in the direction of line B-B'. As shown in FIG. 1, the third housing 300 may be rotated with respect to the second housing 200 such that the front surface 301 of the third housing 300 faces substantially the same direction as the front surface 201 of the second housing 200 and is substantially positioned on one plane with the front surface of the second housing, and may be rotated with respect to the second housing such that a rear surface 302 of the third housing 300 faces the rear surface 202 of the second housing 200.

Referring to FIG. 2, in an electronic device 10, the size (or area) of the first housing 100 and the size (or area) of the second housing 200 may be different from each other. The size of the first housing 100 may be smaller than the size of the second housing 200. For example, if the first housing 100 and the second housing 200 share a rotation axis (e.g., an A-A' rotation axis) on one side, the length from an end of one side surface of the first housing 100 to an end of the other side surface thereof may be smaller than the length from an end of one side surface of the second housing 200 to an end of the other side surface thereof.

When the first housing 100 is superimposed on the second housing 200, an end of the first housing 100 may be configured so as not to cover the entire of the second housing 200. The above-described structure is a housing structure for an AOD function, and a detailed description thereof will be described later with reference to FIGS. 5A and 5B.

The third housing 300 is in an unfolded state from the second housing 200, as shown in FIG. 1. However, in FIG. 2, the third housing 300 is folded with respect to the second housing 300, and thus may not be visible to the outside. The third housing 300 may be received in an inside (e.g., a recess R of FIG. 9 to be described later) of the second housing 200 while being in a folded state.

Figure 3:
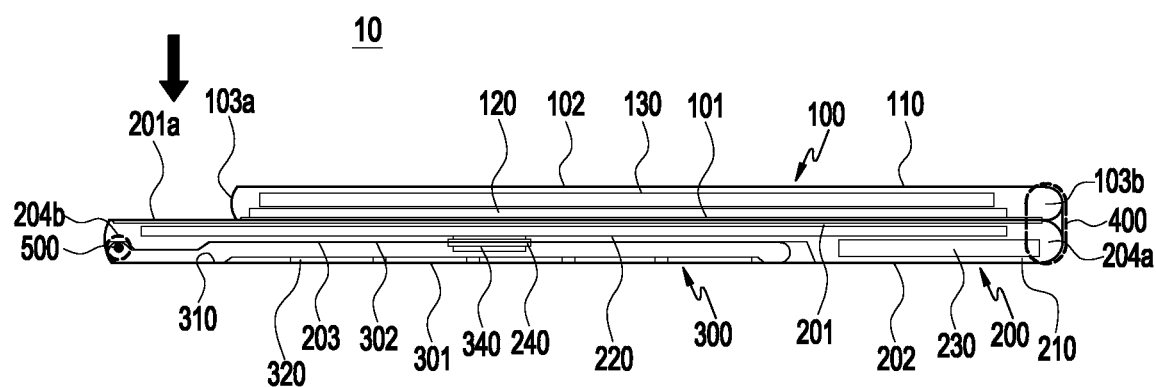
FIG. 3 is a cross-sectional view illustrating a folded state of an electronic device, according to an embodiment.

FIG. 3 is a cross-sectional view illustrating a folded state of the electronic device 10, according to an embodiment. FIG. 3 illustrates a cross-section of the electronic device 10 taken along a direction of line C-C' shown in FIG. 2.

Referring to FIG. 3, more detailed structures of the first housing 100, the second housing 200, and the third housing 300 of the electronic device 10 are disclosed, and an example of the arrangement relationship of the first plate 110, the first display 120, the second plate 210, the second display 220, and various electronic components are disclosed.

The first housing 100 may include a first side surface 103a, a second side surface 103b positioned on the opposite side of the first side surface 103a, and the first plate 110 disposed between the first side surface 103a and the second side surface 103b. The first display 120 may be mounted on one side of the first plate 110. The one side of the first plate 110 may refer to a side of the front surface 101 of the first housing 100. The other side of the first plate 110 may be a part which covers the rear surface 102 of the first housing 100, and can protect the first display 120 from external physical impact in a state in which the electronic device 10 is folded (e.g., when the first housing 100 and the second housing 200 are folded).

The second housing 200 may include a third side surface 204a that can face at least a part of the second side surface 103b, a fourth side surface 204b positioned on the opposite side of the third side surface 204b, and the second plate 210 disposed between the third side surface 204a and the fourth side surface 204b. The second display 220 may be mounted on one side of the second plate 210. The one side of the second plate 210 may refer to a side of the front surface 201 of the second housing 200. The other side of the second plate 210 may be a part which covers the rear surface 202 of the second housing 200, and can protect the second display 220 from external physical impact in a state in which the electronic device 10 is folded (e.g., when the first housing 100 and the second housing 200 are folded).

As shown in FIG. 3, in a state where the display portion (e.g., visual regions of the first display and the second display) of the electronic device 10 is closed, the front surface 101 of the first housing 100 may face the front surface 201 of the second housing 200.

The third housing 300 may include the front surface 301 on which the keyboard 320 having the multiple movable keycaps is disposed, the rear surface 302 facing the opposite side of the front surface, and a third plate 310 disposed between the front surface 301 and the rear surface 302. The keyboard 320 having the multiple movable keycaps may be mounted on one side of the third plate 310.

Figure 9:
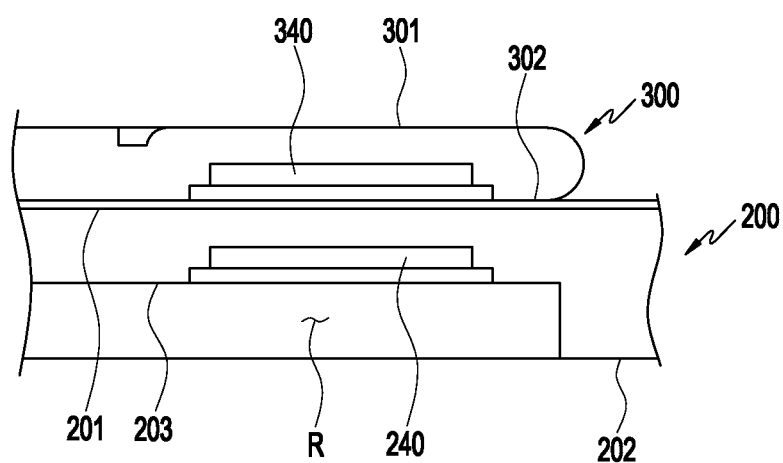
FIG. 9 illustrates a state in which a third housing is placed on a front surface of a second housing, according to an embodiment.

The third housing 300 may be received in a recess R in FIG. 9 disposed on one side of the second housing 200, for example, on a rear surface of the second plate 210 included in the second housing 200. As shown in FIG. 3, the electronic device 10 has a configuration in which three different housings (e.g., the first housing 100, the second housing 200, and the third housing 300) are coupled, but the third housing 300 is configured to be received in the recess of the second housing 200, so that a compact structure can be configured. A seating surface 203 may be disposed on the rear surface of the second plate 210 of the second housing 200 so as to enable each configuration of the electronic device 10 to be stably coupled when the third housing 300 is received in the recess R.

Referring to FIG. 3, the first housing 100 and the second housing 200 may be rotatably coupled to each other by using a first hinge structure 400. The second housing 200 and the third housing 300 may be rotatably coupled to each other by using a second hinge structure 500. The first hinge structure 400 and the second hinge structure 500 are positioned on the opposite sides of the electronic device 10 and can be operated independently of each other. For example, the first hinge structure 400 may be disposed adjacent to the third side surface 204a of the second housing 200, and the second hinge structure 500 may be disposed adjacent to the fourth side surface 204b opposite the third side surface 204a of the second housing 200.

The first hinge structure 400 or the second hinge structure 500 is not limited to a particular embodiment. For example, the first hinge structure 400 may be a hinge structure extending from each of the first housing 100 and the second housing 200 to configure a substantially one body with the first housing 100 and the second housing 200. Additionally or alternatively, the second hinge structure 500 may be a protrusion structure (e.g., as shown by the second hinge structure 500 in FIG. 7B to be described later) configured by integrally extending from one of the second housing 200 and the third housing 300, and may be a hinge structure detachable from the second housing 200 or the third housing 300. In addition, various other hinge structures are applicable.

The first housing 100 and the second housing 200 may be rotated 360° with respect to each other by using the first hinge structure 400. The second housing 100 and the third housing 200 may be rotated 180° with respect to each other by using the second hinge structure 500.

Various components may be included in the first housing 100 and the second housing 200, including but not limited to a processor, a memory, a display, a sound output device, an audio module, a sensor module, an interface, a haptic module, a camera module, a power management module, a battery, a communication module, a subscriber identification module, and an antenna module. In some embodiments, in the electronic device 10, at least one (e.g., a haptic module and a subscriber identification module) of the above components may be omitted or one or more other components may be added. In some embodiments, some of the above components may be implemented as one integrated circuit. For example, the first housing 100 may include a battery 130, and the second housing 200 may include a main printed circuit board 230.

With reference to the second side surface 103b of the first hinge structure 400, the length to one side surface (e.g., the fourth side surface 204b) of the second housing 200 may be configured to be longer than the length to one side surface (e.g., the first side surface 103a) of the first housing 100. Accordingly, a part 201a of the second housing 200 may be exposed to the outside without being covered by the first housing 100. The part 201a of the second housing 200 may be exposed through a part indicated by a thick arrow in FIG. 3. The second display 220 may be visible to the outside through the part 201a of the second housing 200, and accordingly, a state of the electronic device 10 may be displayed or a user input may be performed even when the display portion is closed (e.g., when the first display 120 and the second display 220 are in contact with each other).

The second housing may include a first magnet 240, and the third housing may include a second magnet 340 corresponding to the first magnet. The magnets 240 and 340 will be described in detail later according to the description of FIG. 9.

Figure 4A:
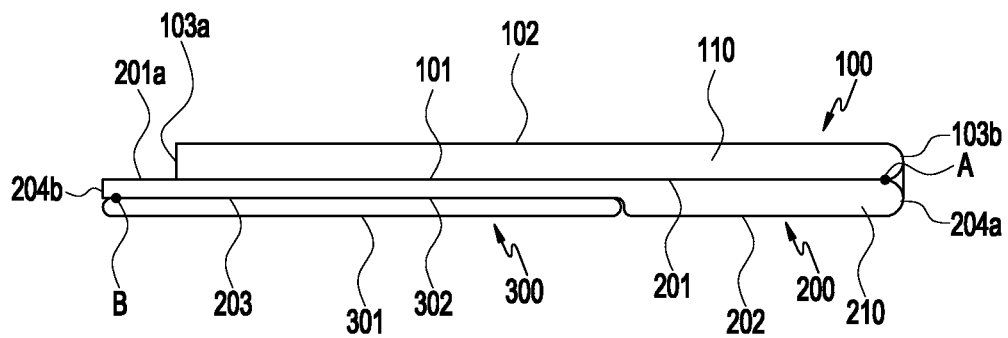
FIG. 4A is a cross-sectional view illustrating a state in which a front surface of a first housing and a front surface of a second housing face each other, according to an embodiment.
Figure 4B:
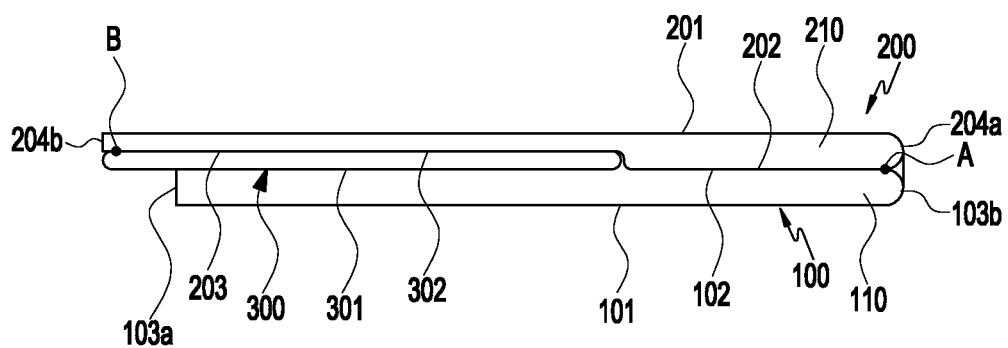
FIG. 4B is a cross-sectional view illustrating a state in which a rear surface of a first housing and a rear surface of a second housing face each other, according to an embodiment.

FIG. 4A is a cross-sectional view illustrating a state in which the front surface 101 of the first housing 100 and the front surface 201 of the second housing 200 face each other, according to an embodiment. FIGS. 4A and 4B are cross-sectional views illustrating a state in which the rear surface 102 of the first housing 100 and the rear surface 202 of the second housing 200 face each other, according to various embodiments. FIGS. 4A and 4B illustrate a cross-section of the electronic device 10 taken along a direction of line C-C' shown in FIG. 2.

Referring to FIGS. 4A-4B, the first housing 100 and the second housing 200 may be rotatably coupled to each other by using a first hinge structure 400, and referring to FIGS. 4A and 4B together, along rotation axis A, the first housing 100 may be rotated 360° with respect to the second housing 200. According to FIG. 4A, the rear surface 102 of the first housing 100 may be placed to face the outside and the rear surface 202 of the second housing 200 may also be placed to face the outside. According to FIG. 4B, the front surface 101 of the first housing 100 may be placed to face the outside and the front surface 201 of the second housing 200 may also be placed to face the outside. According to the embodiment shown in FIG. 4B, the electronic device 10 may be used as an electronic device which provides a front/rear tablet mode.

Figure 5A:
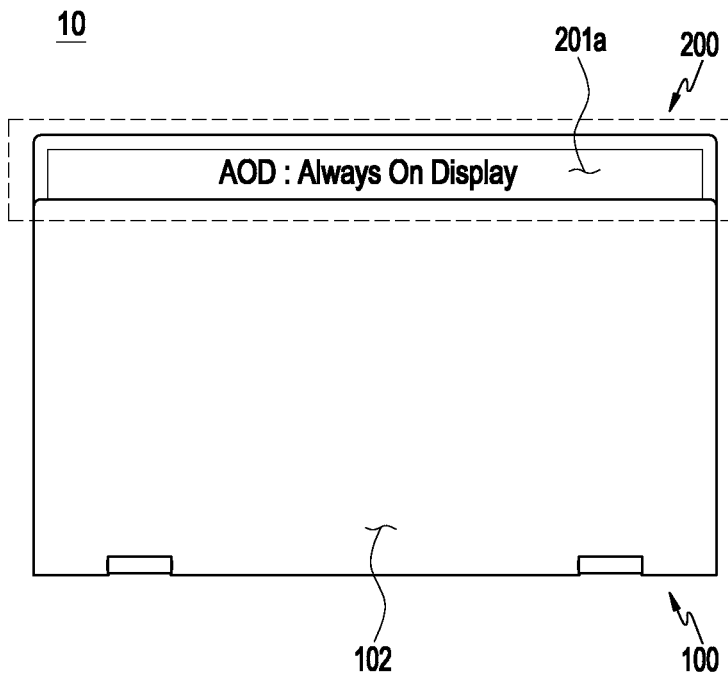
FIG. 5A illustrates a state in which a part of a display is always exposed to the outside of a housing, according to an embodiment.
Figure 5B:
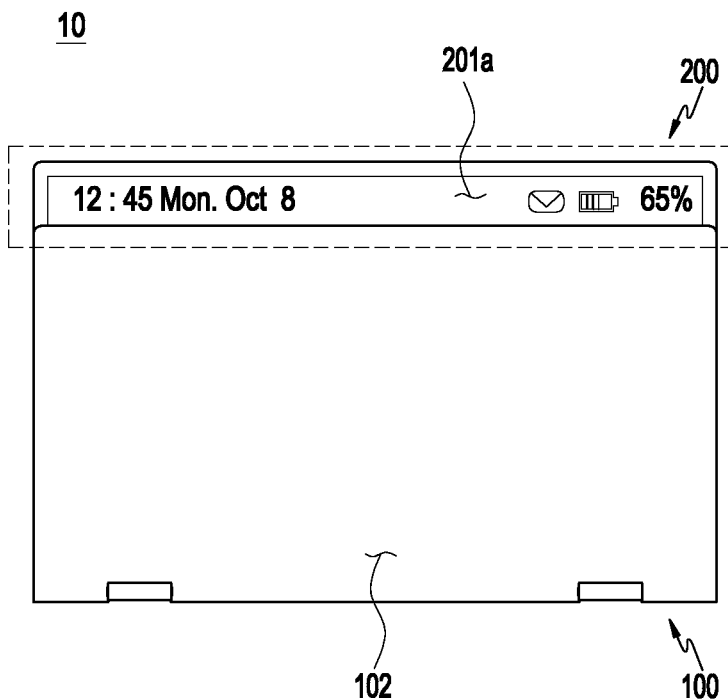
FIG. 5B illustrates an example of a state displayed on a display when a part of the display is always exposed to the outside of a housing in the embodiment shown in FIG. 5A.

FIG. 5A illustrates a state in which a part 201a of a display 220 is always exposed to the outside of a housing, according to an embodiment. FIG. 5B illustrates an example of a state displayed on the display when the part 201a of the display 220 is always exposed to the outside of the housing in the embodiment shown in FIG. 5A. FIGS. 5A and 5B may illustrate a state in which the electronic device 10 is viewed in the direction of the arrow shown in FIG. 3.

The area of one housing among the first housing 100 and the second housing 200 may be configured to be smaller than the area of the other housing, and in a state where the first housing 100 is fully folded with respect to the second housing 200, a part 201a of a display included in a housing having a larger area among the first housing 100 and the second housing 200 may be viewed from the outside.

Most conventional laptop computers adopt a structure in which at least a part of a display portion is not viewed from the outside in a state where the display portion is closed. However, in the embodiment of the disclosure, even in a state where a display portion is closed, at least a part of the display portion is always visible from the outside (e.g., as an AOD), so that user convenience can be improved.

For example, the part 201a of the second display 220 is always exposed to the outside of the second housing 200, so that various operations, such as displaying of a state of the electronic device 10 and an input by a user, can be performed.

For example, as shown in FIG. 5B, states of the electronic device 10 such as a clock state, a date state, and a remaining battery level state may be simply displayed on the part 201a of the display that is always exposed to the outside. In addition, various embodiments are applicable.

Hereinafter, various use states of the keyboard 320 including the multiple movable keycaps included in the electronic device 10 are described with reference to FIGS. 6A to 6D.

Figure 6A:
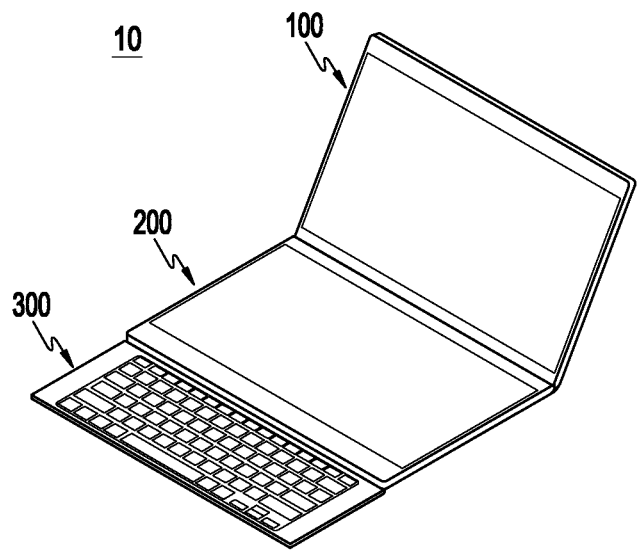
FIG. 6A illustrates a first use state of a keyboard having multiple movable keycaps included in an electronic device, according to an embodiment.
Figure 6B:
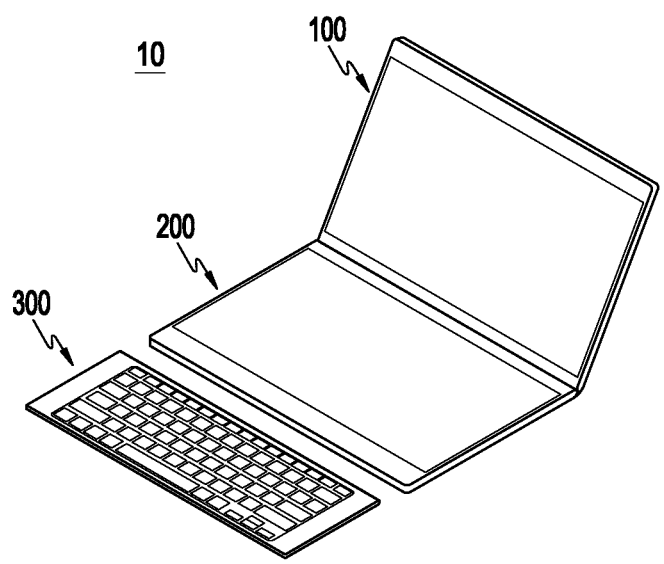
FIG. 6B illustrates a second use state of a keyboard having multiple movable keycaps included in an electronic device, according to an embodiment.
Figure 6C:
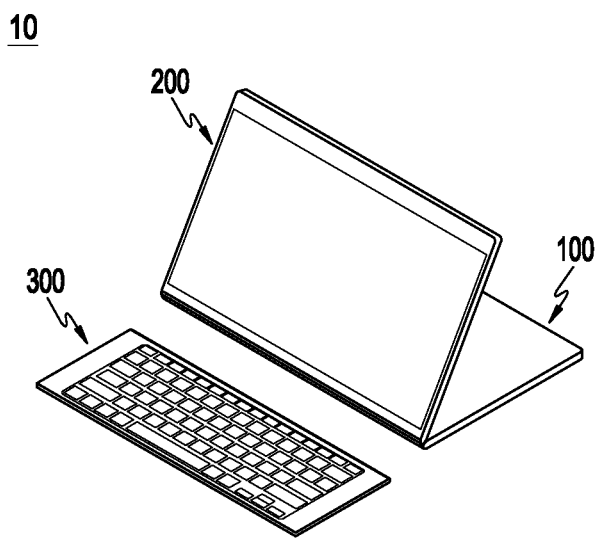
FIG. 6C illustrates a third use state in which multiple movable keycaps included in an electronic device are disposed, according to an embodiment.
Figure 6D:
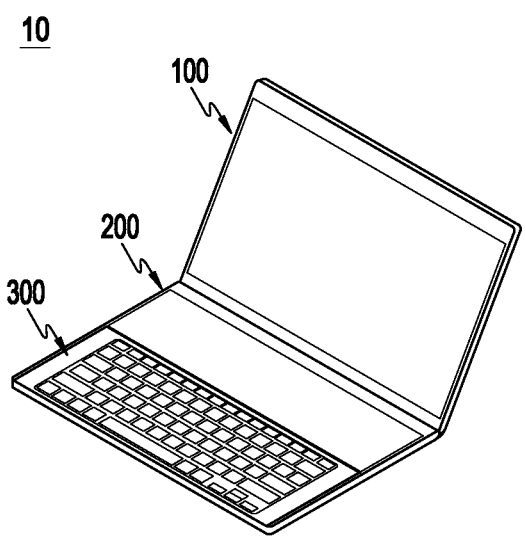
FIG. 6D illustrates a fourth use state in which multiple movable keycaps included in an electronic device are disposed, according to an embodiment.

FIG. 6A illustrates a first use state of the keyboard 320 including the multiple movable keycaps included in the electronic device 10, according to an embodiment. FIG. 6B illustrates a second use state of the keyboard 320 including the multiple movable keycaps included in the electronic device 10, according to an embodiment. FIG. 6C illustrates a third use state of the keyboard 320 including the multiple movable keycaps included in the electronic device 10, according to an embodiment. FIG. 6D illustrates a fourth use state of the keyboard 320 including the multiple movable keycaps included in the electronic device 10, according to an embodiment.

In FIG. 6A, the third housing 300 including the keyboard 320 may be used on substantially the same plane as the second housing 200. The embodiment shown in FIG. 6A shows a state in which the third housing 300 including the keyboard 320 is rotated and thus unfolded while being coupled to the second housing 200. Accordingly, a user can use a keyboard providing a physical click feeling only by a simple operation of taking out the keyboard 320 from the second housing 200 and unfolding the same. In FIG. 6B, the third housing 300 including the keyboard 320 may be used while being separated and spaced apart from the second housing 200. In FIG. 6C, the third housing 300 including the keyboard 320 may be used while being separated and spaced apart from the second housing 200, and may be used by adapting to various use aspects of the first housing 100 and the second housing 200 as well. A key input through the keyboard 320 may be performed not only through a display disposed in the first housing 100 but also through a display disposed in the second housing 200. In FIG. 6D, the third housing 300 including the keyboard 320 may be used while being placed on the second housing 200. The electronic device 10 may recognize a state in which the third housing 300 is placed on the second housing 200, and thus freely adjust screen display regions of the display disposed in the first housing 100 and the display disposed in the second housing 200. The adjustment of the screen display regions of the displays may be performed via a processor electrically connected to the displays, and a memory which is operatively connected to the processor and in which various instructions (or algorithms) are stored.

The third housing 300 may be detachably connected to the second housing 200. The third housing 300 may provide a physical click feeling to a user to provide convenience of use, and the third housing 300 may be received in the second housing 200 as needed, and used separately from the second housing 200 according to another need, so that various conveniences can be provided to a user.

Figure 7A:
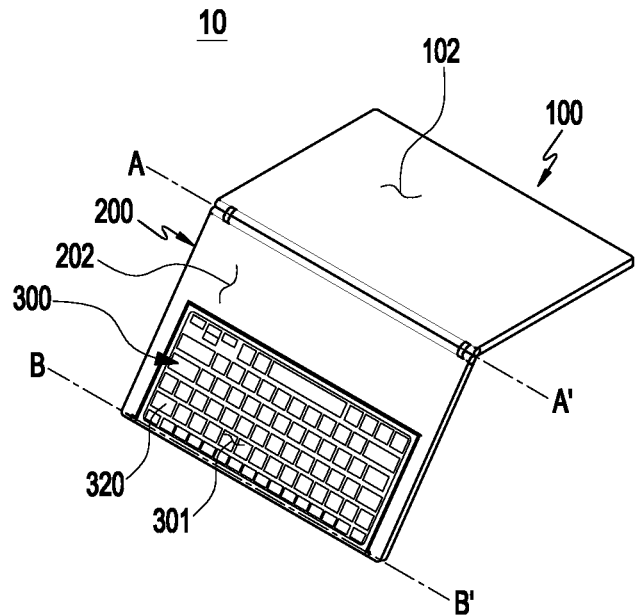
FIG. 7A illustrates a method for attaching/detaching a third housing included in an electronic device, according to an embodiment.
Figure 7B:
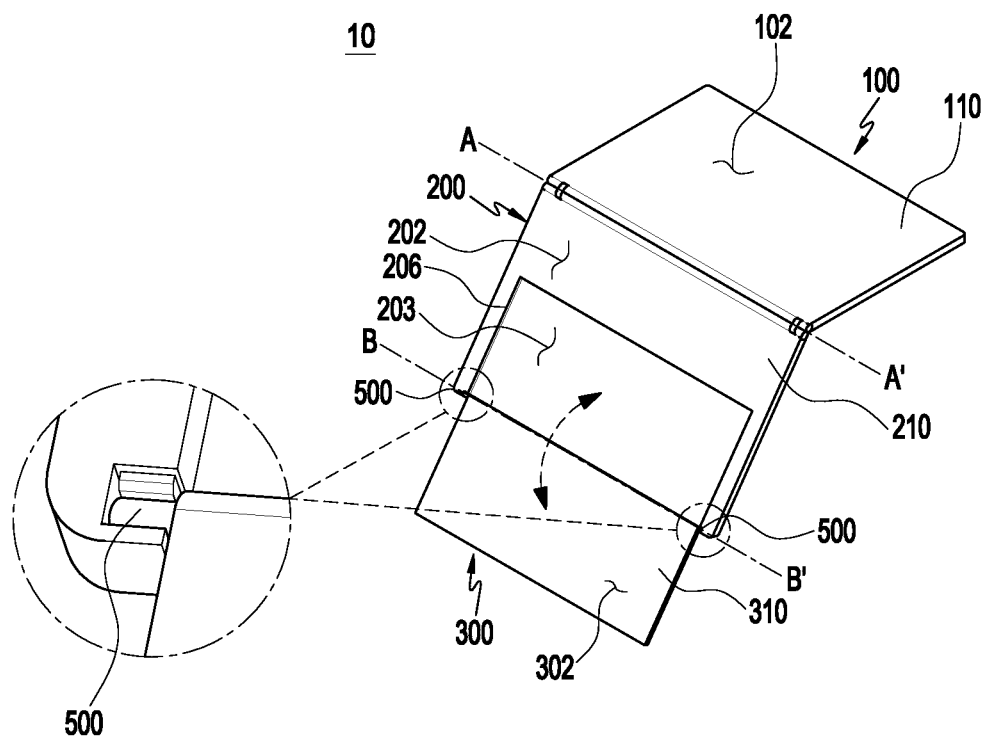
FIG. 7B illustrates a method for attaching/detaching a third housing included in an electronic device, according to an embodiment.

FIG. 7A illustrates a method for attaching/detaching the third housing 300 included in the electronic device 10, according to an embodiment. FIG. 7B illustrates a method for attaching/detaching the third housing 300 included in the electronic device 10, according to an embodiment. FIGS. 7A and 7B may be perspective views of the rear surface 202 of the second housing 200 of the electronic device 10.

Referring to FIGS. 7A and 7B together, the third housing 300 may be coupled to the rear surface of the second housing 200 in various aspects. The third housing 300 may be rotatably coupled to one side of the second housing 200. For example, the third housing 300 may be rotatably coupled to at least a part of a fourth side surface 204b of the second housing 200.

The third housing may be coupled so as to slide through at least a part of the fourth side surface 204b such that the third housing can be received in the recess. In this case, a guide member 206 is disposed inside the recess R of the second housing 200, so that the third housing 300 may be guided to be slidably coupled to the recess along the guide member 206.

Figure 8:
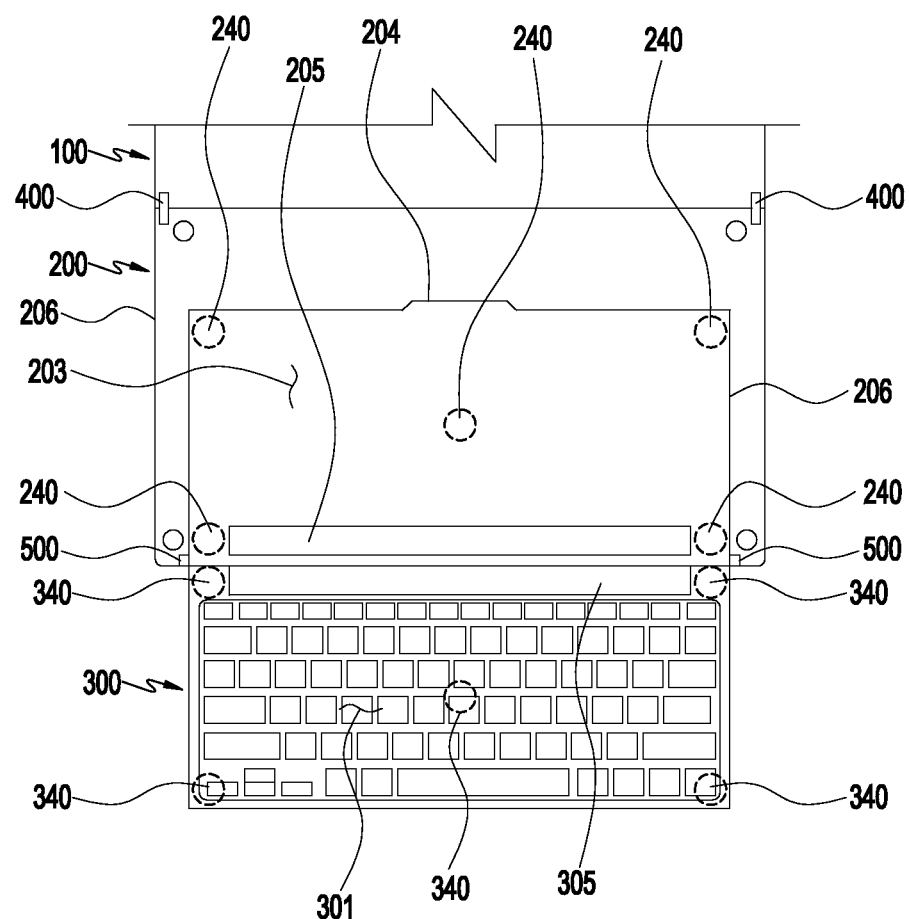
FIG. 8 illustrates coupling means of a second housing and a third housing included in an electronic device, according to an embodiment.

FIG. 8 illustrates various coupling means of the second housing 200 and the third housing 300 included in the electronic device 10, according to an embodiment.

In addition to the above-described embodiments, various couplings between the second housing 200 and the third housing 300 may be possible.

Referring to FIG. 8, the magnets 240 and 340 may be disposed on the second plate of the second housing 200 and the third plate of the third housing 300. A plurality of magnets 240 and a plurality of magnets 340 may be arranged on the respective plates.

When the third housing 300 is received in the recess R of the second housing 200, the third housing 300 may be fixed in the recess by an interaction between the first magnets 240 and the second magnets 340.

The magnets 240 disposed on the second plate of the second housing 200 and the magnets 340 disposed on the third plate of the third housing 300 may be arranged at positions corresponding to each other. Accordingly, when the third housing 300 is received in the recess R of the second housing 200, the third housing may be easily coupled by the magnetic attraction of the magnets.

In addition, various connectors 204 and 205 may be disposed in the second housing 200, and connectors corresponding to the various connectors may be disposed in the third housing 300, so that the second housing 200 and the third housing 300 may be electrically coupled to each other. The connectors may have a shape such as a pogo pin, and thus perform a battery charging operation.

FIG. 9 illustrates a state in which the third housing 300 is placed on the front surface 201 of the second housing 200, according to an embodiment.

Referring to FIG. 9, when the third housing 300 is placed on the front surface of the second housing 200 while being separated from the second housing 200, a position of the third housing 300 may be fixed on the second housing 200 by the interaction between the first magnets 240 and the second magnets 250.

Even when the third housing 300 is used in a state where the third housing 300 is not received in the recess of the second housing 200 and is placed on the front surface 201 of the second housing 200, the third housing 300 may be stably mounted and used by using the magnetic attraction of the magnets 240 and 250.

According to various embodiments of the disclosure, an electronic device having dual displays applied thereto is provided, so that a user can perform a task through a wide screen. In addition, a keyboard having a physical click feeling is provided, so that usability can be improved.

According to various embodiments of the disclosure, by enabling at least a part of one display among dual displays to be viewed from the outside even in a state where a display portion is closed, a user can check a state of an electronic device without directly opening the display portion.

Figure 10:
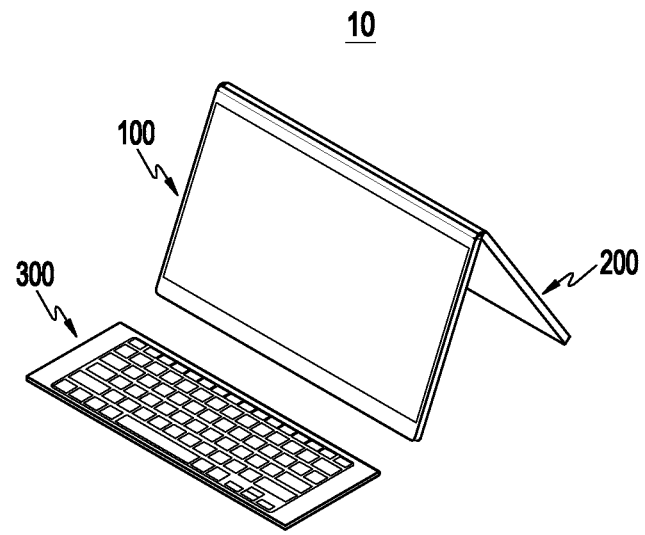
FIG. 10 illustrates a use state of an electronic device, according to an embodiment.
Figure 11:
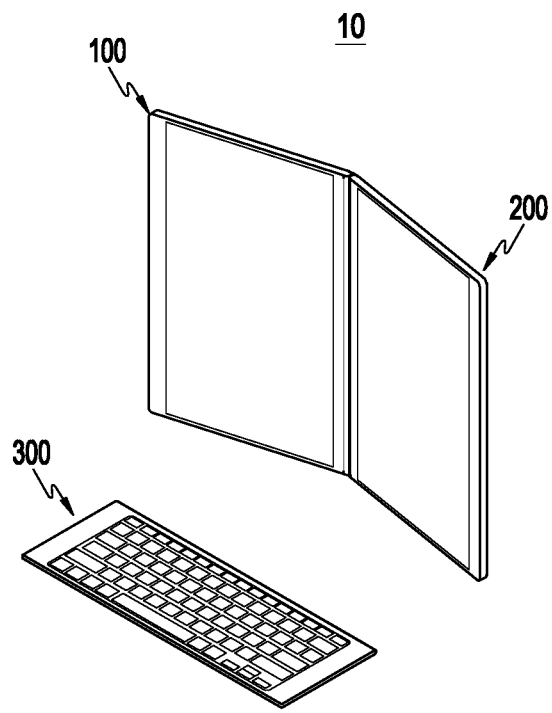
FIG. 11 illustrates a use state of an electronic device, according to an embodiment.
Figure 12:
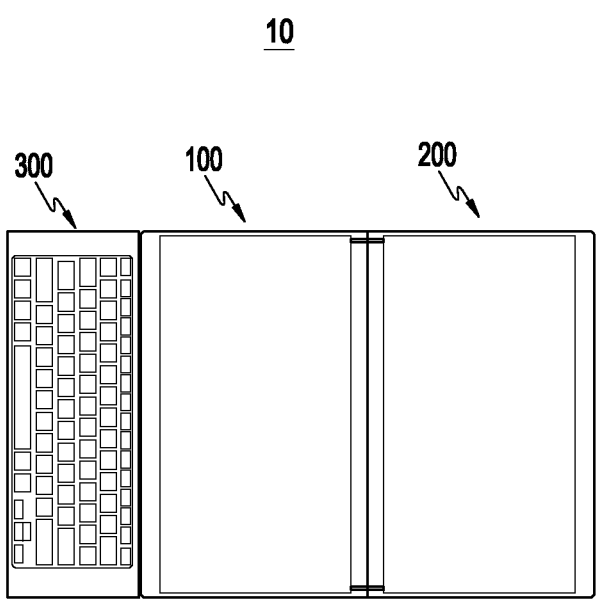
FIG. 12 illustrates a use state of an electronic device, according to an embodiment.

Hereinafter, various use states of the electronic device 10 according to embodiments other than the above-described embodiments will be described with reference to FIGS. 10 to 12. FIG. 10 illustrates a use state of the electronic device 10, according to an embodiment. FIG. 11 illustrates a use state of the electronic device 10, according to an embodiment. FIG. 12 illustrates a use state of the electronic device 10, according to an embodiment.

FIGS. 6A to 6D illustrate embodiments in which, for example, the electronic device 10 as a laptop computer is used in a clamshell mode. In addition, the electronic device 10 can be used in a tent mode in a state where two housings are erected in the front direction and side surfaces of the housings are supported on the floor as shown in FIG. 10, and in a vertical mode used in a state where two housings are erected in a lateral direction and side surfaces of the housings are supported on the floor as shown in FIG. 11. In addition, the electronic device 10 may be used in more various modes such as a consulting mode as shown in FIG. 12.

According to an embodiment, an electronic device includes a first housing including a first side surface, a second side surface positioned on the opposite side of the first side surface, a first plate disposed between the first side surface and the second side surface, and a first display; a second housing including a third side surface that can face at least a part of the second side surface, a fourth side surface positioned on the opposite side of the third side surface, a second plate disposed between the third side surface and the fourth side surface, and a second display, the second housing having a recess disposed on a rear surface of the second plate; and a third housing including a keyboard including multiple movable keycaps, the third housing being coupled so as to rotate with at least a part of the fourth side surface or to slide through at least a part of the fourth side surface such that the third housing can be received in the recess.

The first housing and the second housing may be rotatably coupled to each other by using a first hinge structure.

The first housing and the second housing may be rotated 360° with respect to each other by using the first hinge structure.

The second housing and the third housing may be rotatably coupled to each other by using a second hinge structure.

The second housing and the third housing may be rotated 180° with respect to each other by using the second hinge structure.

The third housing may be detachably connected to the second housing.

The second housing may include a first magnet, and the third housing may include a second magnet corresponding to the first magnet.

When the third housing is placed on the front surface of the second housing while being separated from the second housing, a position of the third housing may be fixed on the second housing by an interaction between the first magnet and the second magnet.

When the third housing is received in the recess of the second housing, the third housing may be fixed in the recess by the interaction between the first magnet and the second magnet.

The area of one housing among the first housing and the second housing is configured to be smaller than the area of the other housing, and in a state in which the first housing is fully folded with respect to the second housing, a part of a display included in a housing having a larger area among the first housing and the second housing may be viewed from the outside.

According to an embodiment, an electronic device includes a first housing including a first side surface, a second side surface positioned on the opposite side of the first side surface, a first plate disposed between the first side surface and the second side surface, and a first display; a second housing including a third side surface that can face at least a part of the second side surface, a fourth side surface positioned on the opposite side of the third side surface, a second plate disposed between the third side surface and the fourth side surface, and a second display; and a third housing including a keyboard having multiple movable keycaps, the third housing being connected to at least a part of the fourth side surface and detachably coupled to at least a part of the fourth side surface of the second housing.

According to an embodiment, an electronic device includes a first housing including a first display; a second housing including a second display; and a third housing including a keyboard having multiple movable keycaps, the third housing being detachably coupled to a recess disposed in the second housing, wherein the third housing is coupled so as to rotate while being connected to at least a part of the second housing or to slide through at least one side surface of the second housing such that the third housing can be received in the recess, and in a state in which the first housing is fully folded with respect to the second housing, a part of one of the first display and the second display is visible from the outside.

Embodiments disclosed herein are provided merely to describe technical contents of the disclosure and to help the understanding of the technical contents, and are not intended to limit the scope of the technology described herein. Therefore, it should be construed that the scope of the disclosure includes any change or other various embodiments based on the technical idea of the disclosure.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   a first housing comprising a first side surface, a second side surface positioned on an opposite side of the first side surface, a first plate disposed between the first side surface and the second side surface, and a first display;
   a second housing comprising a third side surface capable of facing at least a part of the second side surface, a fourth side surface positioned on an opposite side of the third side surface, a second plate disposed between the third side surface and the fourth side surface, and a second display, the second housing having a recess disposed on a rear surface of the second plate; and
   a third housing comprising a keyboard having multiple movable keycaps, the third housing being coupled so as to rotate with at least a part of the fourth side surface or to slide through at least a part of the fourth side surface such that the third housing is configured to be received in the recess,
   wherein rotating the third housing 180 degrees from the recess or sliding the third housing from the recess through the at least part of the fourth side surface causes the multiple movable keycaps of the keyboard to face in a same direction as the second display,
   wherein the second housing comprises a first magnet, and the third housing comprises a second magnet corresponding to the first magnet,
   wherein when the third housing is placed on a front surface of the second housing while being separated from the second housing, a position of the third housing is fixed on the second housing by an interaction between the first magnet and the second magnet, and
   wherein when the third housing is received in the recess of the second housing, the third housing is fixed in the recess by an interaction between the first magnet and the second magnet.

2. The electronic device of claim 1, wherein the first housing and the second housing are rotatably coupled to each other by using a first hinge structure.

3. The electronic device of claim 2, wherein the first housing and the second housing are rotatably coupled 360 degrees with respect to each other by using the first hinge structure.

4. The electronic device of claim 1, wherein the second housing and the third housing are rotatably coupled to each other by using a second hinge structure.

5. The electronic device of claim 4, wherein the second housing and the third housing are rotatably coupled 180 degrees with respect to each other by using the second hinge structure.

6. The electronic device of claim 1, wherein the third housing is detachably connected to the second housing.

7. The electronic device of claim 6, wherein the third housing is detachably connected to at least a part of the fourth side surface of the second housing.

8. The electronic device of claim 1, wherein an area of one housing among the first housing and the second housing is configured to be smaller than an area of the other housing, and in a state in which the first housing is fully folded with respect to the second housing, a part of a display included in a housing having a larger area among the first housing and the second housing is visible from the outside.

9. An electronic device comprising:
   a first housing comprising a first display;
   a second housing comprising a second display; and
   a third housing comprising a keyboard having multiple movable keycaps, the third housing being detachably coupled to a recess disposed in the second housing,
   wherein the third housing is coupled so as to rotate while being connected to at least a part of the second housing or to slide through at least one side surface of the second housing such that the third housing can be received in the recess, and in a state in which the first housing is fully folded with respect to the second housing, a part of one of the first display and the second display is visible from the outside,
   wherein rotating the third housing 180 degrees from the recess or sliding the third housing from the recess through the at least one side surface of the second housing causes the multiple movable keycaps of the keyboard to face in a same direction as the second display,
   wherein the second housing comprises a first magnet, and the third housing comprises a second magnet corresponding to the first magnet,
   wherein when the third housing is placed on a front surface of the second housing while being separated from the second housing, a position of the third housing is fixed on the second housing by an interaction between the first magnet and the second magnet, and
   wherein when the third housing is received in the recess of the second housing, the third housing is fixed in the recess by an interaction between the first magnet and the second magnet.

10. The electronic device of claim 9, wherein the first housing and the second housing are rotatably coupled to each other by using a first hinge structure.

11. The electronic device of claim 9, wherein the second housing and the third housing are rotatably coupled to each other by using a second hinge structure.

12. The electronic device of claim 9, wherein the second housing comprises a first magnet, and the third housing comprises a second magnet corresponding to the first magnet.

* * * * *